United States Patent
Vialen et al.

(10) Patent No.: US 7,602,917 B2
(45) Date of Patent: *Oct. 13, 2009

(54) METHOD OF CIPHERING DATA TRANSMISSION IN A RADIO SYSTEM

(75) Inventors: Jukka Vialen, Espoo (FI); Fabio Longoni, Espoo (FI)

(73) Assignee: Nokia Corporation, Espoo (FI)

( * ) Notice: Subject to any disclaimer, the term of this patent is extended or adjusted under 35 U.S.C. 154(b) by 153 days.

This patent is subject to a terminal disclaimer.

(21) Appl. No.: 11/013,184

(22) Filed: Dec. 15, 2004

(65) Prior Publication Data

US 2006/0120530 A1 Jun. 8, 2006

Related U.S. Application Data

(62) Division of application No. 09/519,184, filed on Mar. 6, 2000, now Pat. No. 6,882,727.

(30) Foreign Application Priority Data

Mar. 8, 1999 (FI) ..................... 990500

(51) Int. Cl.
*H04K 1/10* (2006.01)
(52) U.S. Cl. ................... 380/270; 380/272; 380/34
(58) Field of Classification Search .......... 380/270, 380/43, 44, 47, 272, 34
See application file for complete search history.

(56) References Cited

U.S. PATENT DOCUMENTS

| | | | |
|---|---|---|---|
| 4,418,425 A | 11/1983 | Fennel et al. ............ 380/33 |
| 4,484,025 A | 11/1984 | Ostermann et al. ........ 380/279 |
| 4,797,921 A | 1/1989 | Shiraishi ................. 380/28 |
| 5,016,275 A | 5/1991 | Smith | |
| 5,148,485 A | 9/1992 | Dent | |
| 5,185,796 A | 2/1993 | Wilson ................. 380/277 |
| 5,278,906 A | 1/1994 | Boly et al. ............. 380/268 |
| 5,285,497 A | 2/1994 | Thatcher, Jr. .......... 380/217 |

(Continued)

FOREIGN PATENT DOCUMENTS

CA 2411999 10/1998

(Continued)

OTHER PUBLICATIONS

Huovinen, Lasse, "Authentication and Security in GPRS environment: An Overview", Department of Computer Science and Engineering, Helsinki University of Technology, Helsinki, Finland, May 28, 2008, pp. 1-13.
Patent Abstracts of Japan, 03-233792, Publication Date Oct. 17, 1991.
Patent Abstracts of Japan, 09-134124, Publication Date May 20, 1997.

(Continued)

*Primary Examiner*—Ellen Tran
(74) *Attorney, Agent, or Firm*—Perman & Green, LLP

(57) ABSTRACT

The invention relates to a method of ciphering data transmission in a radio system, and to a user equipment using the method, and to a radio network subsystem using the method. The method includes the steps of: (602) generating a ciphering key; (604A) producing a ciphering mask in a ciphering algorithm using the ciphering key as an input parameter; (604B) using a logical channel specific parameter or a transport channel specific parameter as an additional input parameter to the ciphering algorithm; and (606) producing ciphered data by applying the ciphering mask to plain data.

34 Claims, 13 Drawing Sheets

U.S. PATENT DOCUMENTS

| | | | |
|---|---|---|---|
| 5,319,712 A * | 6/1994 | Finkelstein et al. | 380/44 |
| 5,345,506 A | 9/1994 | Tsubakiyama et al. | |
| 5,375,169 A | 12/1994 | Seheidt et al. | |
| 5,412,730 A | 5/1995 | Jones | 380/46 |
| 5,455,863 A | 10/1995 | Brown et al. | 380/23 |
| 5,500,650 A | 3/1996 | Snodgrass et al. | 342/42 |
| 5,537,474 A | 7/1996 | Brown et al. | |
| 5,544,245 A | 8/1996 | Tsubakiyama | |
| 5,596,641 A | 1/1997 | Ohashi et al. | |
| 5,600,722 A | 2/1997 | Yamaguchi et al. | 380/21 |
| 5,604,806 A * | 2/1997 | Hassan et al. | 380/44 |
| 5,675,581 A | 10/1997 | Soliman | 370/252 |
| 5,689,563 A * | 11/1997 | Brown et al. | 380/247 |
| 5,696,828 A | 12/1997 | Koopman, Jr. | 380/46 |
| 5,729,537 A | 3/1998 | Billstrom | |
| 5,745,575 A * | 4/1998 | Otto et al. | 380/270 |
| 5,771,288 A * | 6/1998 | Dent et al. | 380/270 |
| 5,884,158 A | 3/1999 | Ryan, Jr. et al. | |
| 5,987,137 A | 11/1999 | Karppanen et al. | |
| 5,987,139 A * | 11/1999 | Bodin | 380/44 |
| 6,081,600 A | 6/2000 | Blanchard et al. | |
| 6,097,817 A * | 8/2000 | Bilgic et al. | 380/270 |
| 6,137,885 A | 10/2000 | Totaro et al. | |
| RE36,946 E | 11/2000 | Diffie et al. | |
| 6,178,506 B1 | 1/2001 | Quick, Jr. | |
| 6,192,474 B1 | 2/2001 | Patel et al. | |
| 6,330,333 B1 | 12/2001 | Mizikovsky et al. | |
| 6,373,946 B1 | 4/2002 | Johnston | 380/211 |
| 6,374,112 B1 | 4/2002 | Widegren et al. | |
| 6,374,355 B1 | 4/2002 | Patel | |
| 6,453,159 B1 | 9/2002 | Lewis | |
| 6,463,055 B1 | 10/2002 | Lupien et al. | |
| 6,526,506 B1 | 2/2003 | Lewis | |
| 6,535,979 B1 * | 3/2003 | Vialen et al. | 713/163 |
| 6,580,906 B2 * | 6/2003 | Bilgic et al. | 455/422.1 |
| 6,618,395 B1 | 9/2003 | Kimmitt | |
| 6,690,679 B1 | 2/2004 | Turunen et al. | |
| 6,810,258 B1 | 10/2004 | Vialen | |
| 6,826,406 B1 | 11/2004 | Vialen et al. | |
| 6,842,445 B2 | 1/2005 | Ahmavaara et al. | |
| 6,845,095 B2 | 1/2005 | Krishnarajah et al. | |
| 6,882,727 B1 * | 4/2005 | Vialen et al. | 380/33 |
| 6,973,189 B1 | 12/2005 | Bodin | |
| 7,065,340 B1 | 6/2006 | Einola et al. | |
| 2006/0120530 A1 | 6/2006 | Vialen et al. | |

FOREIGN PATENT DOCUMENTS

| | | |
|---|---|---|
| EP | 0673178A2 A2 | 9/1995 |
| EP | 0752772A2 A2 | 1/1997 |
| EP | 0757459 A2 | 2/1997 |
| GB | 2305822 A | 4/1997 |
| WO | WO/97/12461 | 4/1997 |
| WO | WO 99/39525 | 8/1999 |

OTHER PUBLICATIONS

Patent Abstracts of Japan, 08-316951, Publication Date Nov. 29, 1996.

Patent Abstracts of Japan, Publication No. JP9181716, Publication Date Jul. 11, 1997.

Patent Abstracts of Japan, Publication No. JP10032569, Publication Date Feb. 3, 1998.

Patent Abstracts of Japan, Publication No. JP9026750, Publication Date Jan. 28, 1997.

* cited by examiner

METHOD OF CIPHERING DATA TRANSMISSION IN A RADIO SYSTEM

CROSS-REFERENCE TO RELATED APPLICATIONS

This application is a divisional of application Ser. No. 09/519,184, filed Mar. 6, 2000, now U.S. Pat. No. 6,882,727, hereby incorporated by reference. The priority of said application is hereby claimed.

FIELD OF INVENTION

The invention relates to a method of ciphering data transmission in a radio system.

BACKGROUND OF INVENTION

Ciphering is today used in many data transmission systems to prevent the data transmitted from falling into the hands of an unauthorized user. The ciphering has grown in significance in the past few years, particularly as wireless telecommunication has become more common.

The ciphering can be performed, for example, by encrypting the information to be transmitted in a transmitter, and by decrypting the information in a receiver. In the encryption means the information to be transmitted, for example a bit stream, is multiplied by a certain number of encryption bit patterns, whereby it is difficult to find out what the original bit stream was if the encryption bit pattern used is unknown.

In a digital GSM system, for example, ciphering is performed on the radio path: a ciphered bit stream to be transmitted onto the radio path is formed by XORing data bits with ciphering bits, the ciphering bits being formed by an algorithm known per se (the A5 algorithm), using a ciphering key Kc. The A5 algorithm encrypts the information transmitted on the traffic channel and the DCCH control channel.

The ciphering key Kc is set when the network has authenticated the terminal but the traffic on the channel has not yet been ciphered. In the GSM system the terminal is identified on the basis of the International Mobile Subscriber Identity IMSI, which is stored in the terminal, or the Temporary Mobile Subscriber Identity TMSI, which is formed on the basis of the subscriber identity. A subscriber identification key Ki is also stored in the terminal. A terminal identification key is also known to the system.

In order that the ciphering would be reliable, information on the ciphering key Kc must be kept secret. The cipher key is therefore transmitted from the network to the terminal indirectly. A Random Access Number RAND is formed in the network, and the number is then transmitted to the terminal via the base station system. The ciphering key Kc is formed by a known algorithm (the A5 algorithm) from the random access number RAND and the subscriber identification key Ki. The ciphering key Kc is computed in the same way both in the terminal and in the network part of the system.

In the beginning, data transmission on a connection between the terminal and the base station is thus not ciphered. The ciphering does not start until the base station system sends the terminal a cipher mode command. When the terminal has received the command, it starts to cipher data to be sent and to decipher received data. Correspondingly, the base station system starts to decipher the received data after sending the cipher mode command and to cipher the sent data after the reception and successful decoding of the first ciphered message from the terminal. In the GSM system the cipher mode command comprises a command to start ciphering, and information on the algorithm to be used.

The problem in the known methods is that they have been designed for the present systems, wherefore they are inflexible and not suited for the ciphering of data transmission in new systems, where several parallel services for one mobile station are possible. If we use the same ciphering mask twice for two or more parallel protocol data units that will be sent using the same air interface frame, then an eavesdropper may deduce a lot of information from the data streams. The amount of information that can be deduced depends on the structure of the data streams. From random data that has no structure one cannot obtain any information, but usually there is a structure in the data, especially in the signaling data.

BRIEF DESCRIPTION OF INVENTION

It is an object of the invention to provide a method, and a user equipment and a radio network subsystem implementing the method, solving the above problems. This is achieved with a method of ciphering data transmission in a radio system, comprising: generating a ciphering key; producing a ciphering mask in a ciphering algorithm using the ciphering key as an input parameter; producing ciphered data by applying the ciphering mask to plain data. Using a logical channel specific parameter or a transport channel specific parameter as an additional input parameter to the ciphering algorithm.

The invention also relates to a user equipment, comprising: generating means for generating a ciphering key; a ciphering algorithm connected with the generating means for producing a ciphering mask using the ciphering key as an input parameter; ciphering means connected with the ciphering algorithm for producing ciphered data by applying the ciphering mask to plain data. The ciphering algorithm uses a logical channel specific parameter or a transport channel specific parameter as an additional input parameter.

The invention further relates to a radio network subsystem, comprising: generating means for generating a ciphering key; a ciphering algorithm connected with the generating means for producing a ciphering mask using the ciphering key as an input parameter; ciphering means connected with the ciphering algorithm for producing ciphered data by applying the ciphering mask to plain data. The ciphering algorithm uses a logical channel specific parameter or a transport channel specific parameter as an additional input parameter.

The preferred embodiments of the invention are claimed in the dependent claims.

Several advantages are achieved with the invention. In the solution of the present invention, ciphering and its properties can be flexibly controlled. The present invention enhances user security in new radio systems. This solution is also better than the known technique, which uses a long enough ciphering mask only once for each air interface frame, because it allows distributed implementation of the needed functionality in the protocol stack.

BRIEF DESCRIPTION OF FIGURES

In the following the invention will be described in greater detail by means of preferred embodiments and with reference to the attached drawings, in which.

DETAILED DESCRIPTION OF INVENTION

The present invention can be used in different mobile telephone systems. In the following examples, the use of the invention is described in the Universal Mobile Telephone System (UMTS) without restricting the invention to it. The examples illustrate the FDD (Frequency Division Duplex) operation of the UMTS, but do not restrict the invention to it.

Figure 1A:
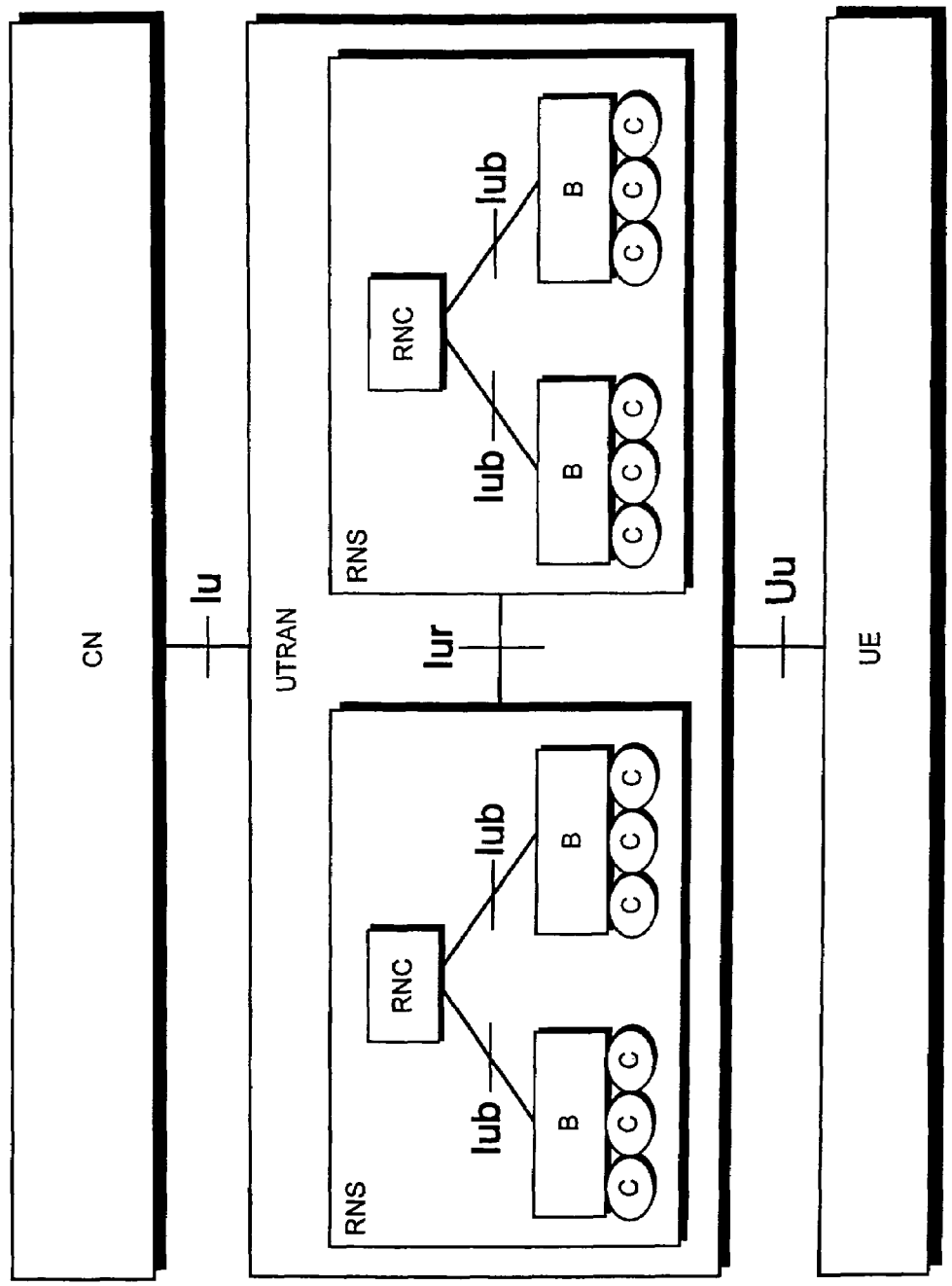
FIGS. 1A and 1B illustrate an example of a mobile telephone system.
Figure 1B:
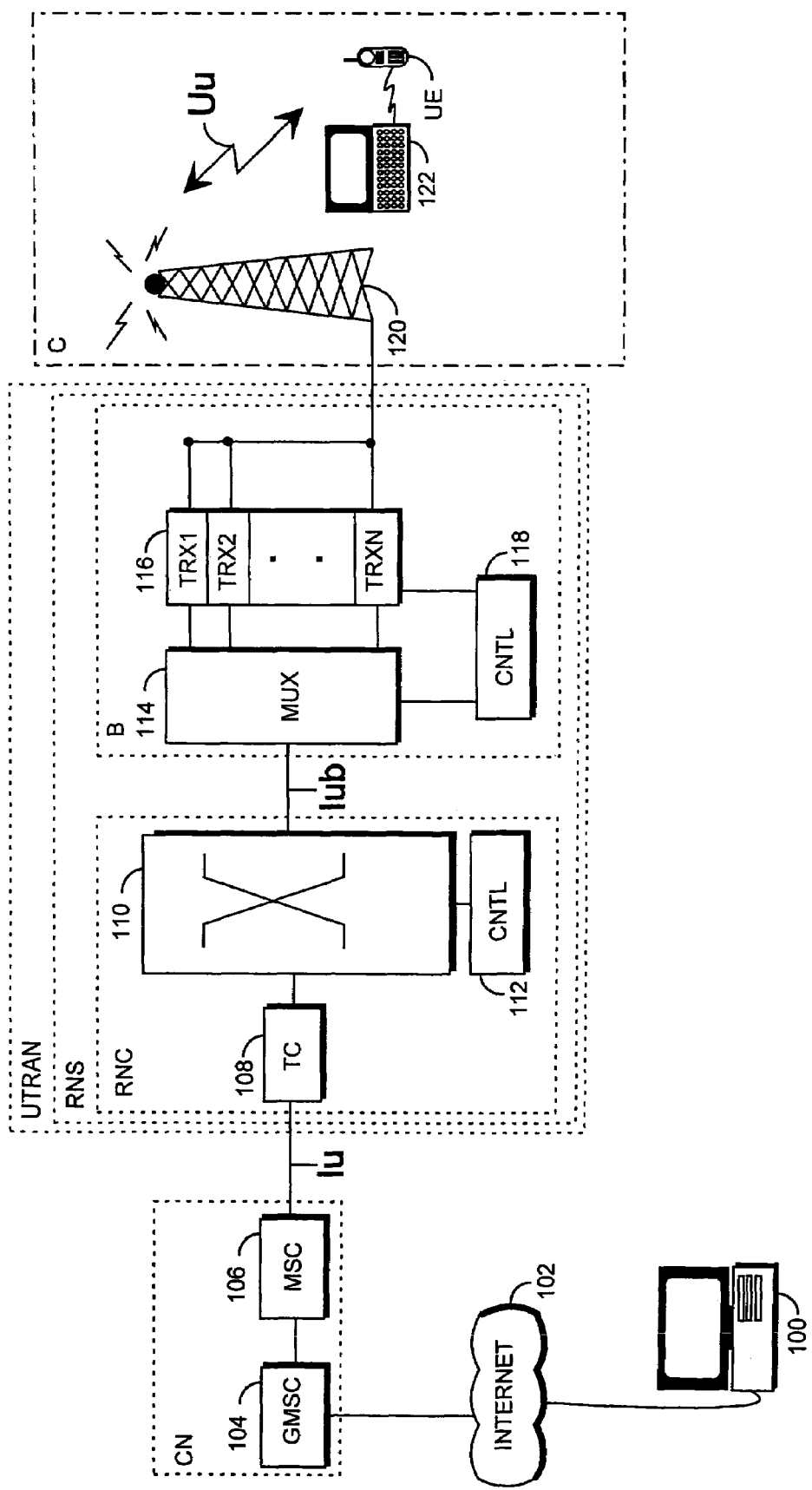

With reference to FIGS. 1A and 1B, a typical mobile telephone system structure will be described. FIG. 1B only comprises the blocks that are essential for the description of the invention, although it is apparent to a person skilled in the art that a common mobile telephone system also comprises other functions and structures, which need not be discussed in greater detail here. The main parts of the mobile telephone system are: a core network CN, a UMTS terrestrial radio access network UTRAN, and a user equipment UE. The interface between the CN and the UTRAN is called the Iu interface, and the interface between the UTRAN and the UE is called the Uu interface.

The UTRAN is composed of radio network subsystems RNS. The interface between two RNSs is called the Iur interface. The RNS is composed of a radio network controller RNC and one or more node Bs B. The interface between the RNC and the node B is called the Iub interface. The reception area of the node B, i.e. cell, is denoted in FIG. 1A by C.

As the presentation in FIG. 1A is very abstract, it is clarified in FIG. 1B by setting forth the parts of the GSM system that correspond to the parts of the UMTS. It is clear that the presented mapping is by no means a binding one but an approximation, because the responsibilities and functions of the parts of the UMTS are still being planned.

FIG. 1B illustrates a packet switched transmission via Internet 102 from a computer 100 connected with the mobile telephone system to a portable computer 122 connected with a user equipment UE. The user equipment UE may be a fixedly mounted wireless local loop terminal, a vehicle-mounted terminal or a hand-held portable terminal, for example.

The infrastructure of the radio network UTRAN is composed of radio network subsystems RNS, i.e. base station subsystems. The radio network subsystem RNS is composed of a radio network controller RNC, i.e. a base station controller, and at least one node B, i.e. a base station, under the control of the RNC.

The node B comprises a multiplexer 114, transceivers 116, and a control unit 118 which controls the operation of the transceivers 116 and the multiplexer 114. The multiplexer 114 arranges the traffic and control channels used by a plurality of transceivers 116 on a single transmission connection Iub.

The transceivers 116 of the node B have a connection to an antenna unit 120 which is used for providing a bi-directional (or sometimes one-way) radio connection Uu to a user equipment UE. The structure of the frames transmitted on the radio connection Uu is determined in detail and the connection is referred to as an air interface.

The radio network controller RNC comprises a group switching field 110 and a control unit 112. The group switching field 110 is used for switching speech and data and for connecting signaling circuits. The node B and the radio network controller RNC form a base station subsystem, which additionally comprises a transcoder, also known as a speech codec, or TRAU (Transcoder and Rate Adapter Unit) 108.

The division of the functions and the physical structures of the radio network controller RNC and the node B may differ according to the actual realization of the radio network subsystem. Typically, the node B implements the radio connection. The radio network controller RNC typically manages the following: radio resource control, inter-cell handover control, power control, timing and synchronization, and paging for user equipment.

The transcoder 108 is usually located as close to a mobile switching center 106 as possible because this allows speech to be transmitted between the transcoder 108 and the radio network controller RNC in a cellular radio network form, which saves transmission capacity.

The transcoder 108 converts different digital speech coding modes used between a public switched telephone network and a cellular radio network to make them compatible, for instance from the 64 kbit/s fixed network form to another form (such as 13 kbit/s) of the cellular radio network, and vice versa. Naturally, the transcoding is carried out only for speech. The control unit 112 carries out call control, mobility management, collection of statistical data and signaling.

The core network CN is composed of the infrastructure belonging to the mobile telephone system which is not part of the UTRAN. FIG. 1B illustrates two equipments, which are part of the core network CN namely a mobile switching center 106, and a gateway mobile switching center 104, which handles mobile telephone system interfaces towards the outside world, in this example towards the Internet 102.

Figure 5:
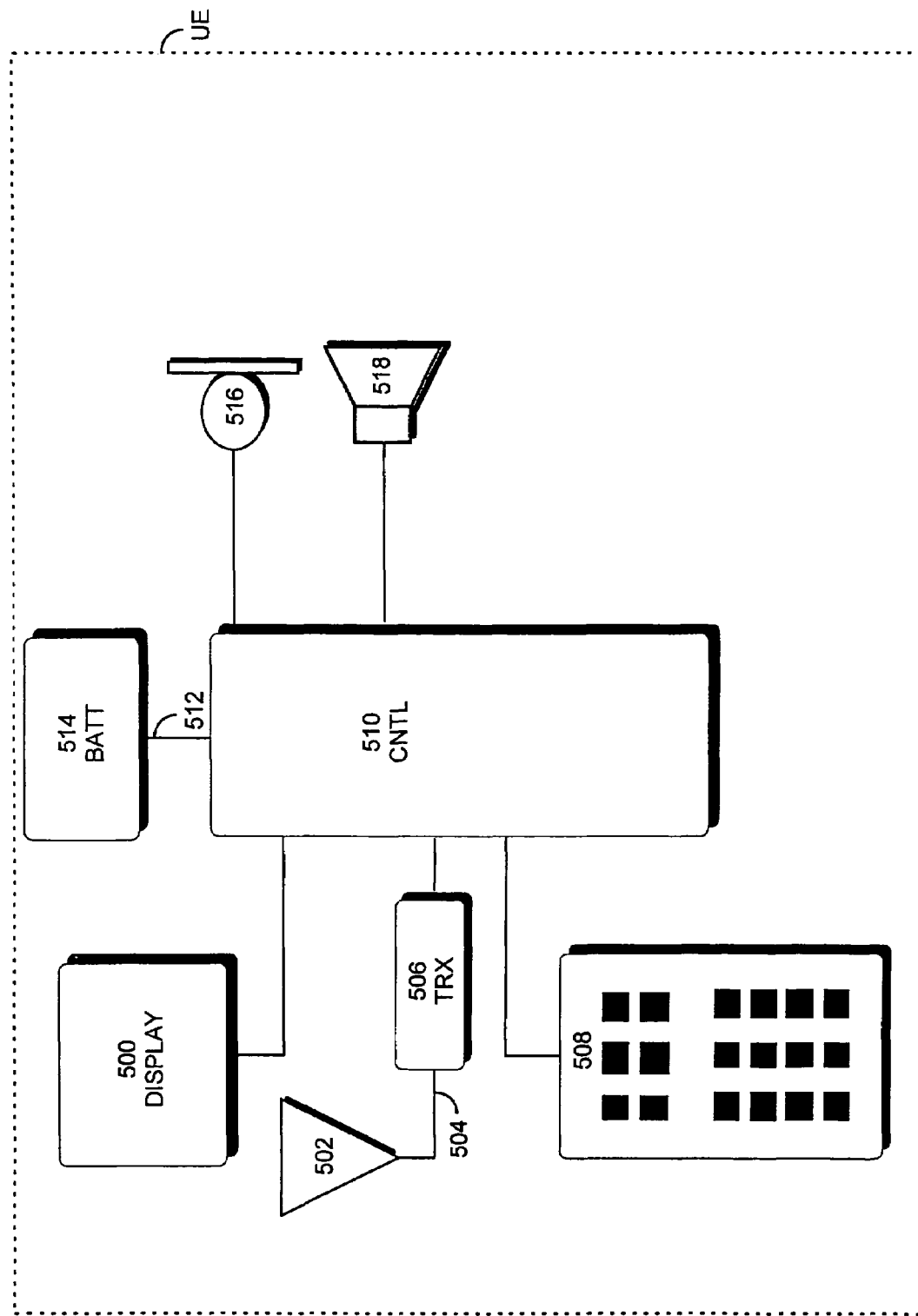
FIG. 5 illustrates a mobile station

FIG. 5 illustrates an exemplary structure of the user equipment UE. The essential parts of the user equipment UE are: an interface 504 to the antenna 502 of the user equipment UE, a transceiver 506, a control part 510 of the user equipment UE, an interface 512 to the battery 514, and a user interface comprising a display 500, a keyboard 508, a microphone 516 and a speaker 518.

Figure 2A:
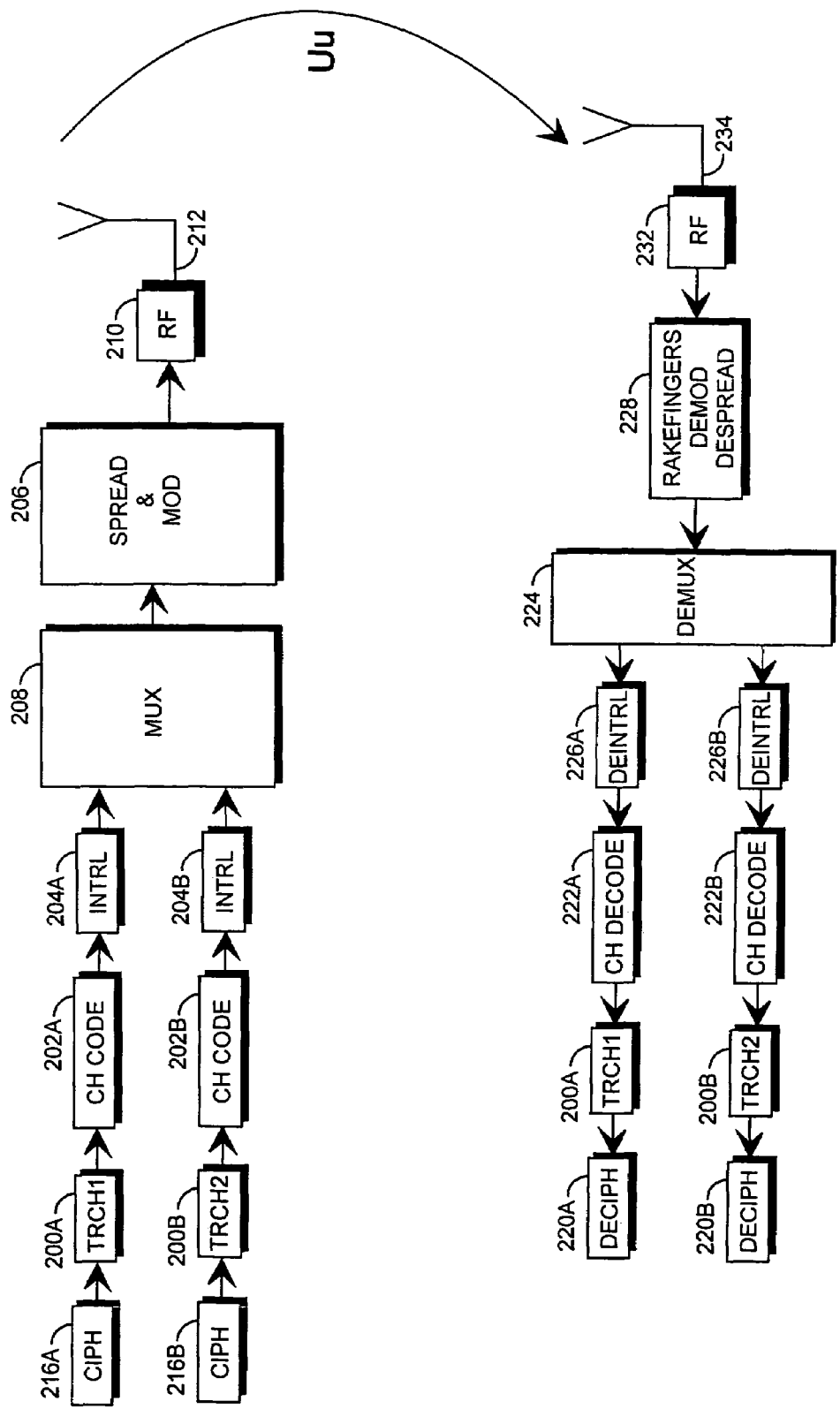
FIG. 2A illustrates a transmitter and a receiver.

FIG. 2A illustrates the functioning of a radio transmitter/radio receiver pair. The radio transmitter may be located in the node B or in the user equipment. Correspondingly the radio receiver may be located in the user equipment or in the node B.

The upper portion of FIG. 2A illustrates the essential functionality of the radio transmitter. Different services placed in a physical channel are, for example, speech, data, moving or still video picture, and the control channels of the system that are processed in the control part 214 of the radio transmitter. The control part 214 is related to the control of the equipment itself and to the control of the connection. FIG. 2A illustrates manipulation of two different transport channels 200A, 200B. Different services call for different source encoding equipment: speech for example calls for a speech codec. For the sake of clarity, source encoding equipment is not, however, presented in FIG. 2A.

First the logical channels are ciphered in blocks 216A, 216B. In the ciphering, ciphered data is produced by applying a ciphering mask to plain data. Then the ciphered data is placed in the transport channel in blocks 200A, 200B. As later will be explained with reference to FIGS. 4A, 4C and 7B the ciphering can be performed either for a logical channel or for a transport channel. Different channels are then channel encoded in blocks 202A and 202B. One form of channel coding is different block codes, one example of which is a cyclic redundancy check, or CRC. Another typical way of performing channel coding is convolutional coding and its different variations, such as punctured convolutional coding and turbo coding.

Having been channel encoded, the channels are interleaved in an interleaver 204A, 204B. The object of the interleaving is to make error correction easier. In the interleaving, the bits are mixed with each other in a predetermined fashion, so that transitory fading on the radio path does not necessarily make the transferred information unidentifiable.

Different signals are multiplexed in block 208 so that they can be sent using the same transmitter.

Figure 2B:
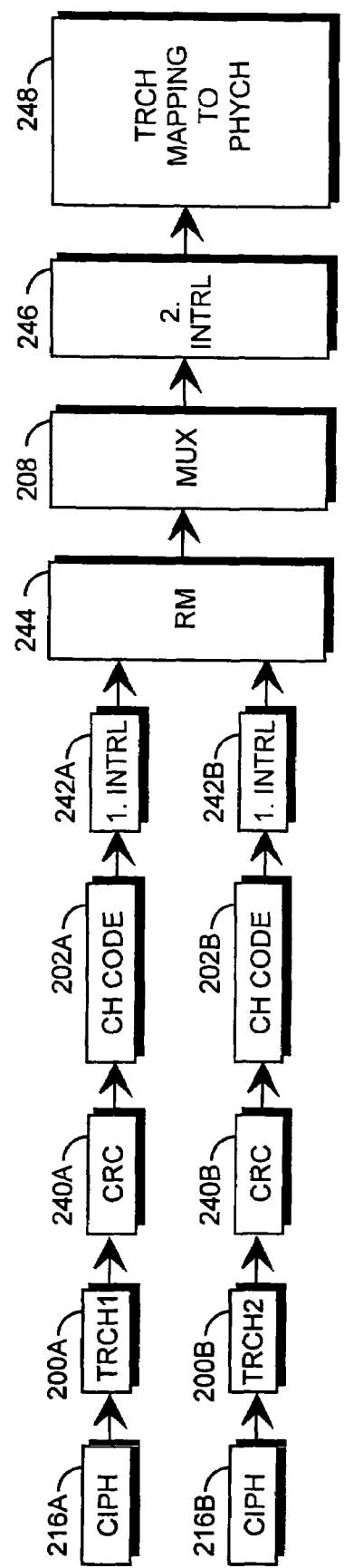
FIG. 2B illustrates transport channel coding and multiplexing.

The interleaved encrypted bits are then spread with a spreading code, scrambled with a scrambling code, and modulated in block 206, whose operation is described in detail in FIG. 2B.

Finally, the combined signal is conveyed to the radio frequency parts 210, which may comprise power amplifiers and bandwidth restricting filters. An analog radio signal is then transmitted through an antenna 212 to the radio path Uu.

The lower portion of FIG. 2A illustrates the typical functionality of a radio receiver. The radio receiver is typically a Rake receiver. The analog radio signal is received from the radio path Uu by an antenna 234. The received signal is conveyed to radio frequency parts 232, which comprise a filter that blocks the frequencies outside the desired frequency band. A signal is then converted in a demodulator 228 into an intermediate frequency or directly into baseband, and in this form the signal is sampled and quantized.

Because the signal in question is a multipath propagated signal, efforts are made to combine the signal components propagated on different multipaths in block 228, which comprises several Rake fingers.

In a so-called rowing Rake finger, delays for the different multipath propagated signal components are searched. After the delays have been found, different Rake fingers are allocated for receiving each of the multipath propagated signals by correlating the received signal with the used spreading code delayed with the found delay of that particular multipath. The different demodulated and despread multipaths of the same signal are then combined in order to obtain a stronger signal.

The received physical channel is then demultiplexed in a demultiplexer 224 into data streams of different channels. The channels are then directed each to a de-interleaver 226A, 226B, where the received physical channel is then de-interleaved. After that the physical channels are processed in a specific channel decoder 222A, 222B, where the channel coding used in the transmission is decoded. Convolutional coding is advantageously decoded with a Viterbi decoder. After this the transport channels are mapped to the logical channels in blocks 200A, 200B, or the other possibility is that the deciphering is performed for the transport channels. The channel decoded channels (logical or transport) are deciphered in blocks 220A, 220B by applying a ciphering mask to the received data. Each received logical channel can be further processed, for example, by transferring the data to the computer 122 connected with the user equipment UE. The control channels of the system are conveyed to the control unit 236 of the radio receiver.

FIG. 2B illustrates how the transport channels are coded and multiplexed. In principle, FIG. 2B is in part the same as FIG. 2A but seen from another perspective. In blocks 240A, 240B a Cyclic Redundancy Check is added to each Transport Block. Interleaving is performed in two stages, in blocks 242A, 242B and 246. When two or more services having different quality of service requirements are multiplexed into one or more physical channels, then service specific rate matching 244 is used. In rate matching the channel symbol rates are adjusted to an optimum level, where the minimum quality of service requirement of each service is fulfilled with the same channel symbol energy. Mapping of the transport channels to physical channels is performed in block 248.

As the ciphering is the key issue in the current invention, its principle will be next described in more detail. In Table 1 the first row represents the plain data bits that have to be transmitted to the recipient. The bits on the second row constitute a ciphering mask. The ciphering mask is applied to the plain data, usually by using the exclusive-or operation, i.e. XOR. The resulting ciphered data is on the third row. This ciphered data is sent through the air interface to the recipient. The recipient then performs deciphering by applying the same ciphering mask that has been used in the transmitter to the received data. The fourth row is a ciphering mask that is summed with the third row by using the XOR operation. The resulting recovered data is presented on the fifth row. As we will see, the recovered data is the same as the plain data.

TABLE 1

| Plain data     | 0 | 1 | 1 | 1 | 0 | 1 | 0 | 0 | 1 | 1 | 1 | 0 | 0 | 1 | 1 | 1 | 0 | 0 | 0 |
|---|---|---|---|---|---|---|---|---|---|---|---|---|---|---|---|---|---|---|---|
| Ciphering mask | 0 | 0 | 1 | 0 | 1 | 0 | 1 | 0 | 0 | 0 | 1 | 0 | 0 | 0 | 0 | 1 | 1 | 1 | 1 |
| Ciphered data  | 0 | 1 | 0 | 1 | 1 | 1 | 1 | 0 | 1 | 1 | 0 | 0 | 0 | 1 | 1 | 1 | 1 | 1 | 1 |
| Ciphering mask | 0 | 0 | 1 | 0 | 1 | 0 | 1 | 0 | 0 | 0 | 1 | 0 | 0 | 0 | 0 | 1 | 1 | 1 | 1 |
| Recovered data | 0 | 1 | 1 | 1 | 0 | 1 | 0 | 0 | 1 | 1 | 1 | 0 | 0 | 1 | 1 | 1 | 0 | 0 | 0 |

Figure 3:
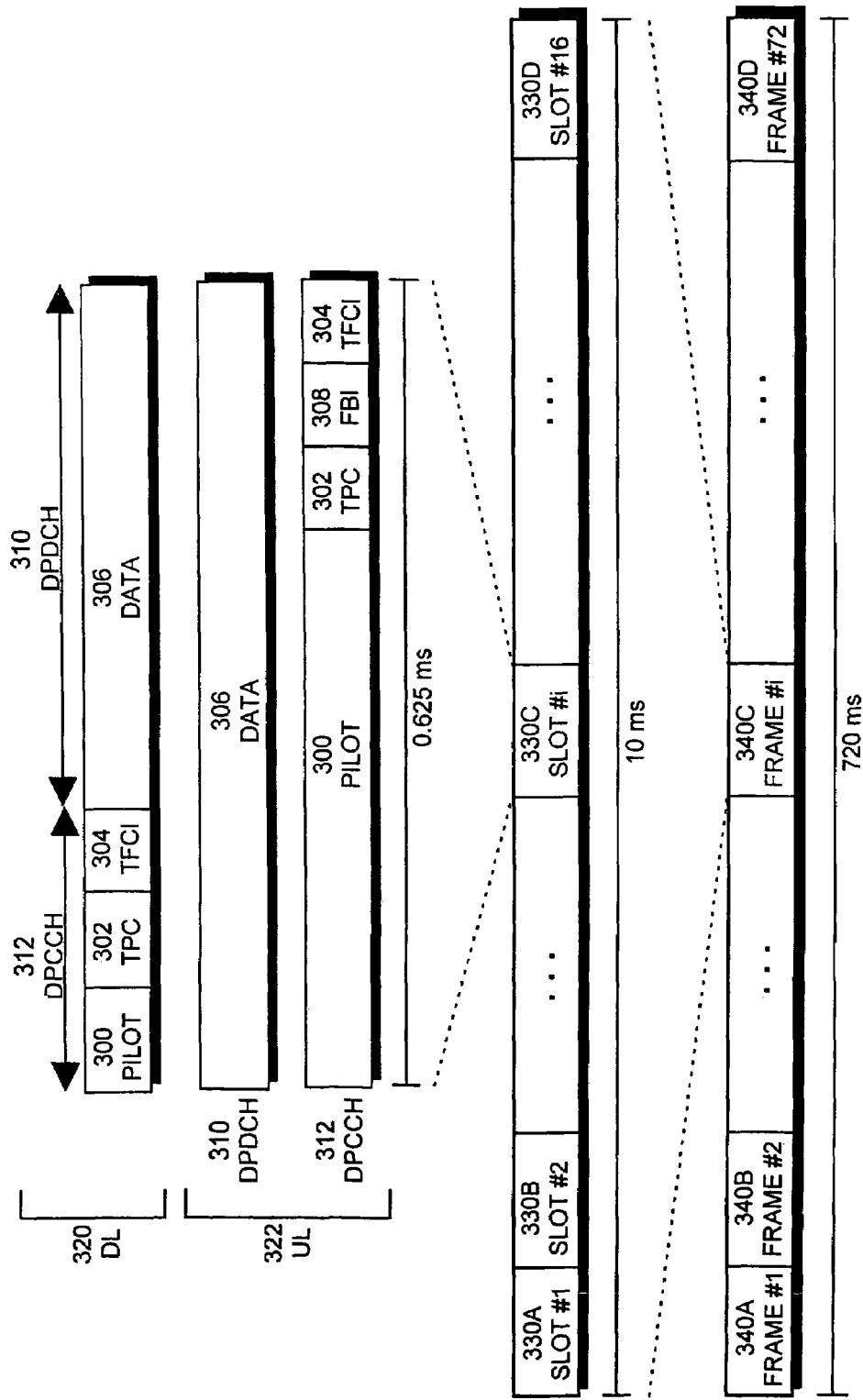
FIG. 3 illustrates a frame structure.

FIG. 3 shows an example of a frame structure used on a physical channel. Frames 340A, 340B, 340C, 340D are given a running number from one to seventy-two, and they form a 720-millisecond long super frame. The length of one frame 340C is ten milliseconds. The frame 340C is divided into sixteen slots 330A, 330B, 330C, 330D. The length of slot 330C is 0.625 milliseconds. One slot 330C corresponds typically to one power control period, during which the power is adjusted for example by one decibel up or down.

The physical channels are divided into different types, including common physical channels and dedicated physical channels.

The common physical channels are used to carry the following transport channels: PCH, BCH, RACH and FACH.

The dedicated physical channels consist of dedicated physical data channels (DPDCH) 310 and dedicated physical control channels (DPCCH) 312. The DPDCHs 310 are used to carry data 306 generated in layer two of the OSI (Open Systems Interconnection) model and layers above it, i.e. dedicated control channels (DCH). The DPCCHs 312 carry the control information generated in layer one of the OSI model. Control information comprises: pilot bits 300 used in channel estimation, feedback information (FBI) 308 transmit power-control commands (TPC) 302, and optionally a transport format combination indicator (TFCI) 304. The TFCI 304 tells the receiver the transport formats of different transport channels, i.e. Transport Format Combination, used in the current frame.

As can be seen from FIG. 3, the down-link DPDCHs 310 and DPCCHs 312 are time multiplexed into the same slot 330C. In the up-link the channels are sent in parallel so that they are IQ/code multiplexed (I=in-phase, Q=quadrature) into each frame 340C.

Figure 7A:
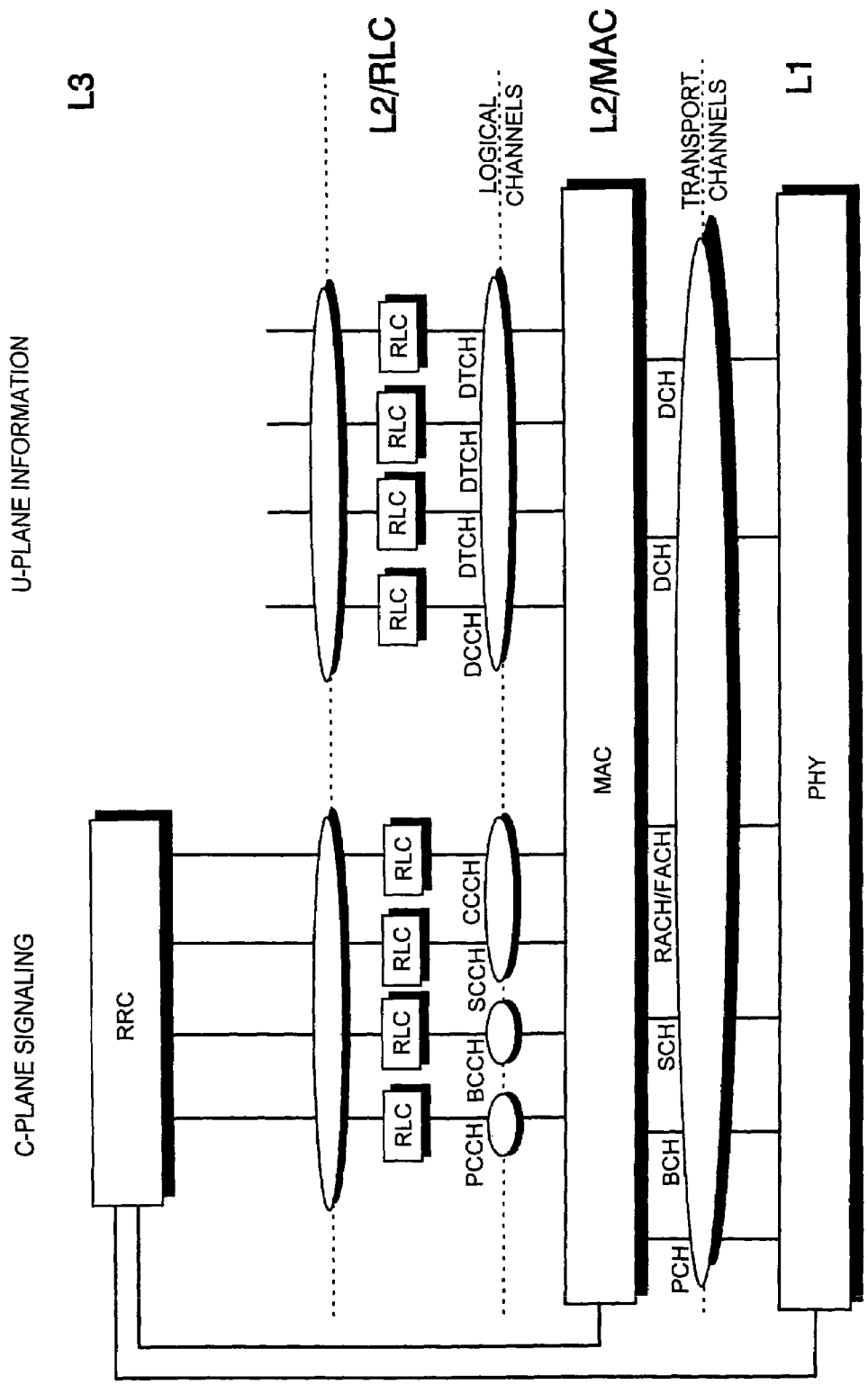
FIG. 7A illustrates an example of a protocol stack.

The channels in the radio interface Uu are processed according to a protocol architecture comprising, according to the ISO (International Standardization Organization) OSI (Open Systems Interconnection) model, three protocol layers: a physical layer (=layer one), a data link layer (=layer two), and a network layer (=layer three). The protocol stacks are located both in the radio network subsystem RNS and in the user equipment UE. Each unit (e.g. user equipment, or radio network subsystem) has a layer which is in logical communication with a layer of another unit. Only the lowest, physical layers communicate with each other directly. The other layers always use the services offered by the next, lower layer. The message must thus physically pass in the vertical direction between the layers, and only in the lowermost layer the message passes horizontally between the layers. FIG. 7A illustrates the layers of the protocol architecture. The ovals between different sub-layers indicate service access points (SAP).

The physical layer L1 offers different transport channels to the MAC sub-layer MAC and higher layers. The physical layer transport services are described by how and with what characteristics data is transferred over the radio interface. The transport channels include a Paging Channel PCH, Broadcast Channel BCH, Synchronization Channel SCH, Random Access Channel RACH, Forward Access Channel FACH, Down-link Shared Channel DSCH, Fast Up-link Signaling Channel FAUSCH, and Dedicated Channel DCH. The physical layer L1 maps transport channels with physical channels. In the FDD (Frequency Division Duplex) mode a physical channel is characterized by the code, frequency and, in the up-link, the relative phase (I/Q). In the TDD (Time Division Duplex) mode the physical channel is also characterized by the time slot.

The transport channels may be divided into common channels (where there is a need for in-band identification of the UEs when particular UEs are addressed) and dedicated channels (where the UEs are identified by the physical channel, i.e. code and frequency for the FDD and code, time slot and frequency for the TDD).

The common transport channel types are as follows. The RACH is a contention based up-link channel used for transmission of a relatively small amount of data, for example of initial access or non-real-time dedicated control or traffic data. The FACH is a common down-link channel without closed-loop power control used for transmission of a relatively small amount of data. The DSCH is a down-link channel shared by several UEs carrying dedicated control or traffic data. The BCH is a down-link channel used for broadcasting system information to an entire cell. The SCH is a down-link channel used for broadcasting synchronization information to an entire cell in the TDD mode. The PCH is a down-link channel used for broadcasting control information to an entire cell allowing efficient UE sleep mode procedures.

The dedicated transport channel types, in turn, are as follows. The DCH is a channel dedicated to one UE used in up-link or down-link. The FAUSCH is an up-link channel used to allocate dedicated channels in conjunction with the FACH. The data link layer is divided into two sub-layers: a MAC sub-layer (Medium Access Control) and a RLC sub-layer (Radio Link Control). The MAC sub-layer L2/MAC offers different logical channels to the RLC sub-layer L2/RLC. The logical channel is characterized by the type of information that is transferred. The logical channels include a Paging Control Channel PCCH, Broadcast Control Channel BCCH, Synchronization Control Channel SCCH, Common Control Channel, Dedicated Control Channel DCCH and Dedicated Traffic Channel DTCH.

The control channels are used for transfer of control plane information only. The SCCH is a down-link channel for broadcasting synchronization information in case of TDD (Time Division Duplex) operation. The BCCH is a down-link channel for broadcasting system control information. The PCCH is a down-link channel that transfers paging information. The CCCH is a bi-directional channel for transmitting control information between the network and the UEs. This channel is commonly used by the UEs having no RRC connection with the network. The DCCH is a point-to-point bi-directional channel that transmits dedicated control information between the UE and the network. This channel is established through an RRC connection setup procedure.

The traffic channels are used for the transfer of user plane information only. The DTCH is a point-to-point channel, dedicated to one UE, for the transfer of user information. A DTCH can exist in both up-link and down-link.

The MAC layer maps logical channels with transport channels. One of the functions of the MAC sub-layer is to select the appropriate transport format for each transport channel depending on the momentary source bit rate.

Figure 7B:
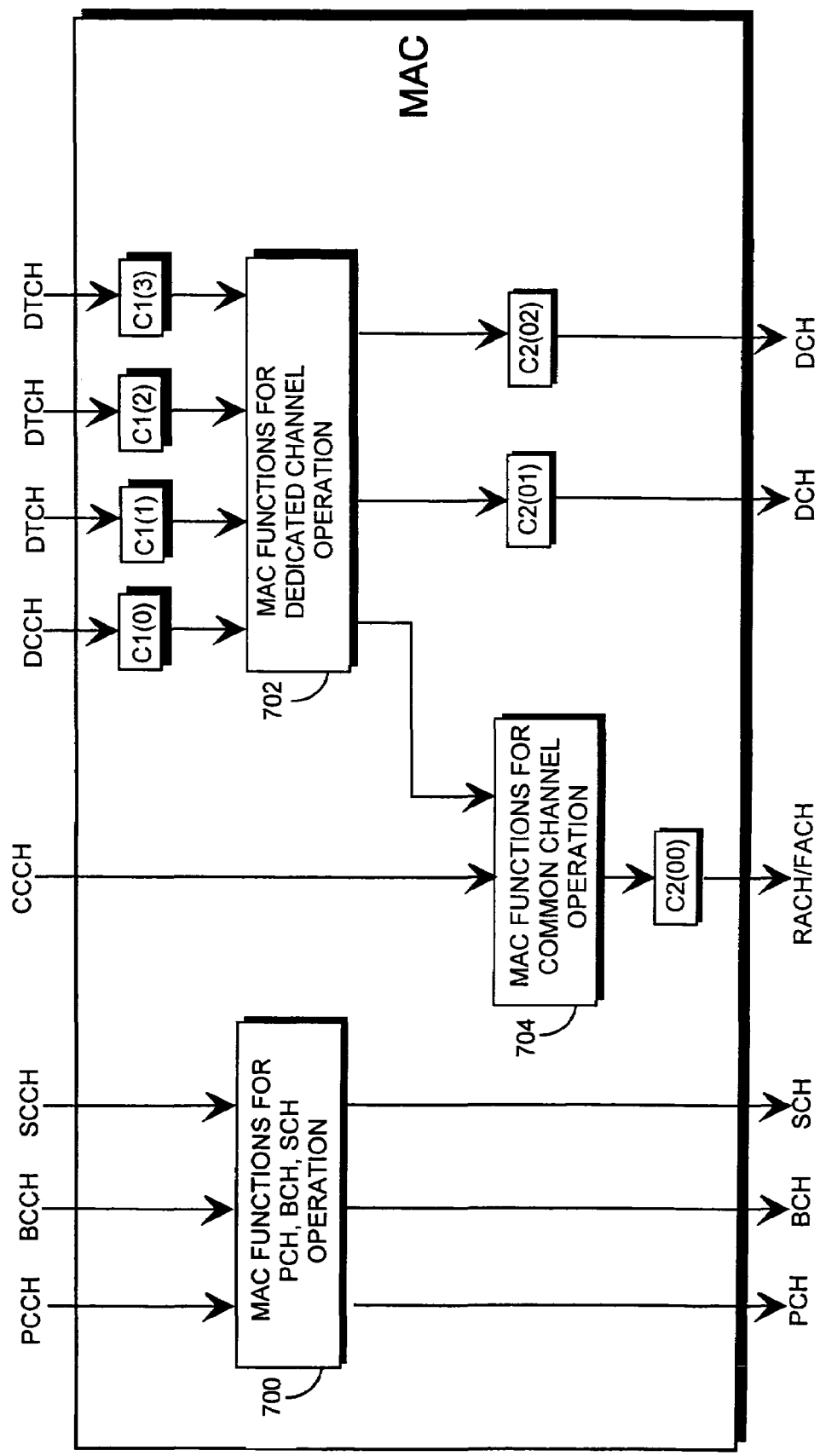
FIG. 7B illustrates an example of a protocol stack according to the invention.
Figure 7C:
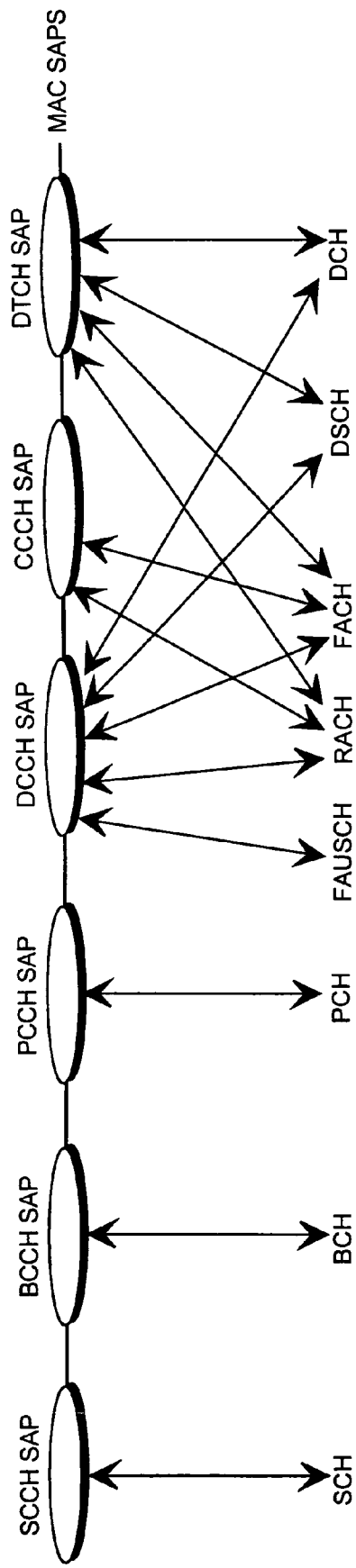
FIG. 7C illustrates mapping between logical channels and transport channels.

FIG. 7C illustrates mapping between logical channels and transport channels. An SCCH is connected to an SCH. A BCCH is connected to a BCH. A PCCH is connected to a PCH. A CCCH is connected to a RACH and a FACH. A DTCH can be connected to either a RACH and a FACH, to a RACH and a DSCH, to a DCH and a DSCH, or to a DCH. A DCCH can be connected to either a RACH and a FACH, to a RACH and a DSCH, to a DCH and a DSCH, to a DCH, or to a FAUSCH.

The third layer L3 has a RRC sub-layer (Radio Resource Control) that handles the control plane signaling of layer three between the user equipment and the network. Among the functions carried out by the RRC sub-layer are assignment, reconfiguration and release of radio resources for the RRC connection. So the RRC sub-layer handles the assignment of the radio resources required for the RRC connection, including the requirements of both the control and the user plane. The RRC layer may reconfigure radio resources during an established RRC connection.

In the present invention we are interested in the encryption of the different services' data flows of one user. According to the known techniques, all data flows would be encrypted using the same ciphering mask.

Figure 6:
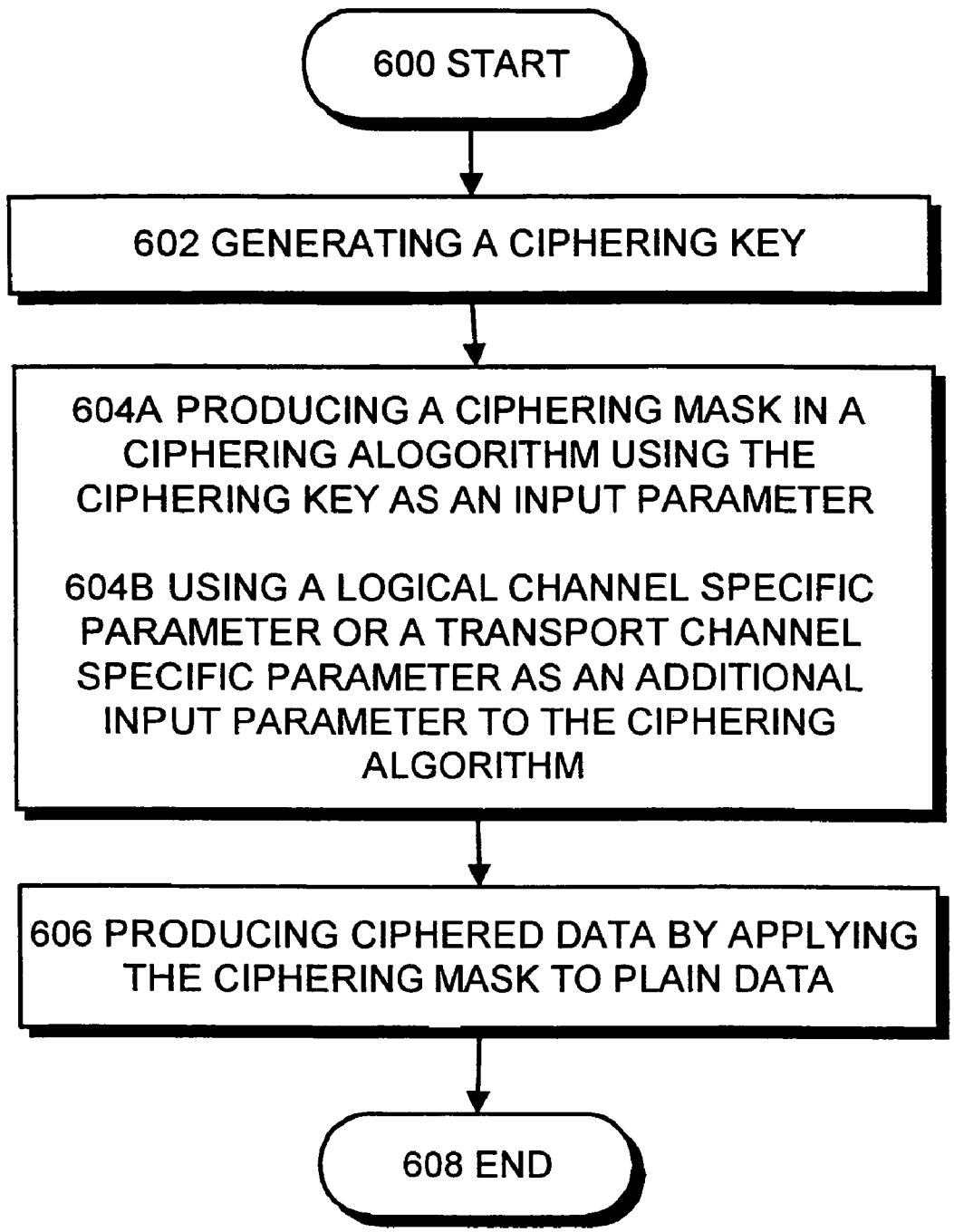
FIG. 6 is a flow diagram illustrating a method according to the invention.

The method according to the invention for ciphering data transmission in a radio system is presented in FIG. 6. The performance of the method begins in block 600.

In block 602 a ciphering key is generated according to a known technique, for example as described in the Background of the Invention section.

In block 604A a ciphering mask is produced in a ciphering algorithm using the ciphering key as an input parameter. Also a logical channel specific parameter or a transport channel specific parameter is used as an additional input parameter to the ciphering algorithm. The logical channel specific parameter can be one of the following: a Radio Access Bearer Identifier, a Logical Channel Identifier, a Signaling Link Identifier, or some other parameter identifying the logical channel used. The transport channel specific parameter can be, for example, the Dedicated Channel Identifier, or some other parameter identifying the transport channel used.

The term 'bearer' is a high-level name for transmission of information used in connection with a network service. Depending on the services, information in the UMTS can usually be transmitted using one or more bearers. The services include, for example, speech transmission, data services and video service. A radio bearer, on the other hand, represents that part of the bearer which extends over the air interface. One logical channel normally carries one radio bearer. A logical channel defines the service offered by the MAC layer. A logical channel can be mapped to different types of transport channels depending on the existing service mode (either to a dedicated transport channel or common transport channels). The transport channels define the services offered by the physical layer. It is also possible to multiplex several logical channels into one transport channel in the MAC layer. The transport channels are further mapped to physical channels in the physical layer. Several transport channels can be multiplexed into one physical channel by layer 1. It is also possible that after transport channel multiplexing the data stream is divided between several physical channels.

The invention can thus be applied to a radio system whose terminals can communicate with other transceivers using one or more parallel radio bearers. Typically, when a call is established between a terminal and a network, a physical channel is first established for a Signaling Radio Bearer SRB between the terminal and the radio network subsystem, and once this channel has been established, the actual traffic bearer(s) can be established. The SRB can also be called a signaling link.

The direction of transmission (up-link/down-link) can be used as an additional input parameter to the ciphering algorithm.

Yet another parameter exists: a radio frame specific parameter can be used as an additional input parameter to the ciphering algorithm. The radio frame specific parameter can be, for example, the User Equipment Frame Number (UEFN), or some other parameter identifying the used radio frame. The radio frame specific parameter depends on the protocol layer where the ciphering function is implemented. If it is implemented in the protocol layer that is terminated in the UE and the CN, then a mechanism for conveying the used frame number to the receiving entity has to be defined. If the ciphering function is located in the MAC layer or layer 1 (or some other layer terminated in the UE and the node B or the RNC), a frame number at least partly consisting of the physical frame number can be used, which means that the used frame number need not be signaled with the data.

In block 606 ciphered data is produced by applying the ciphering mask to plain data, using for example the XOR operation as described in Table 1.

Next, an elaborated example illustrating the implementation of the ciphering method in the transmitter and in the receiver is explained in connection with FIGS. 4A, 4B and 4C. Only the relevant points will be illustrated, but it will be clear for a person skilled in the art how ciphering can be performed in various situations for example with different numbers of PDUs.

Figure 4A:
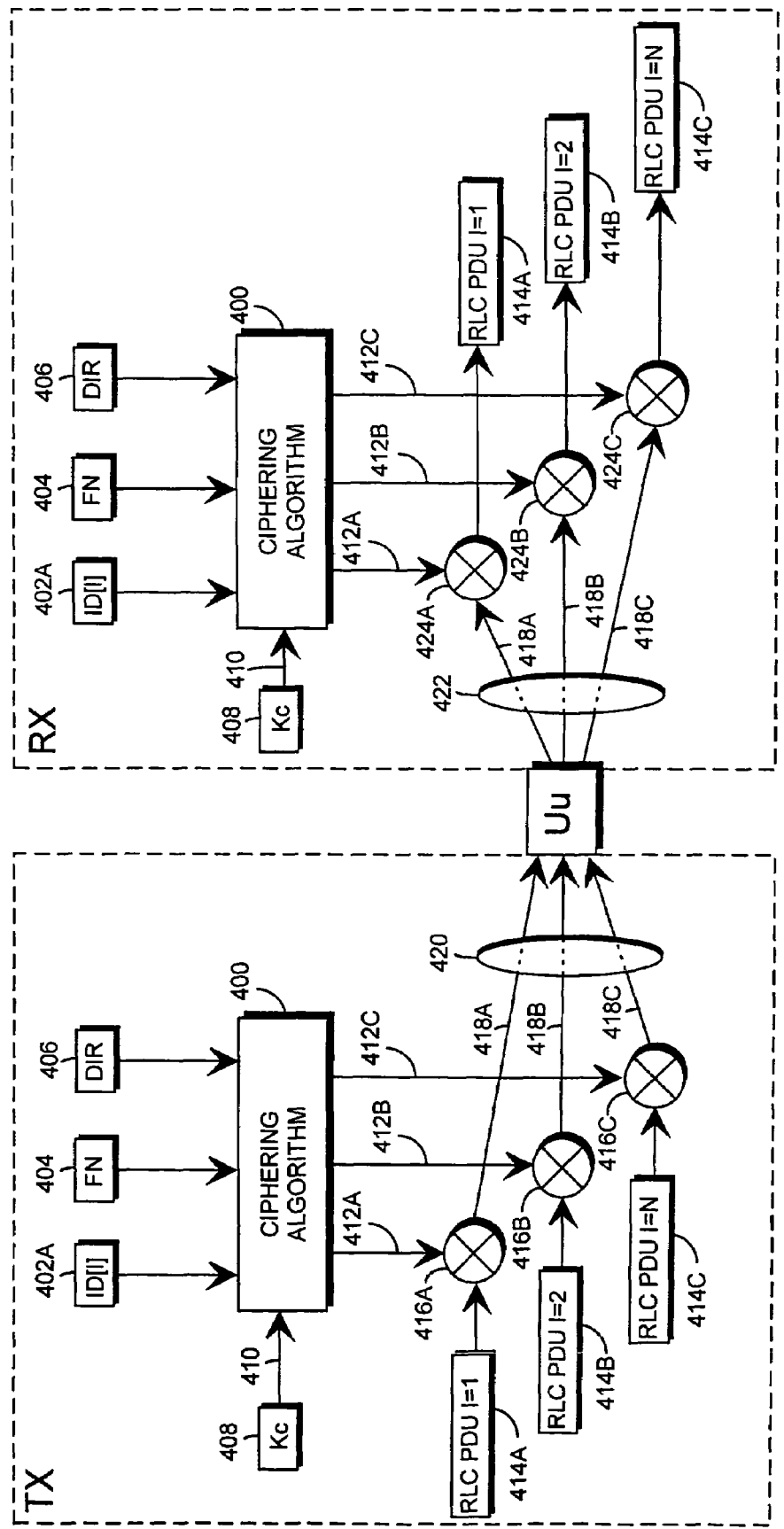
FIGS. 4A, 4B and 4C show a block diagram of a ciphering environment according to the invention.

FIG. 4A describes a block diagram defining the basic ciphering environment defined in this invention. Generating means 408 are used for generating a ciphering key 410 according to a known technique. Connected with the generating means 408 there is a ciphering algorithm 400 for producing ciphering masks 412A, 412B, 412C. The ciphering algorithm uses the generated ciphering key 410 as an input parameter. The ciphering algorithm 400 uses a logical channel specific parameter 402A as an additional input parameter.

Figure 8:
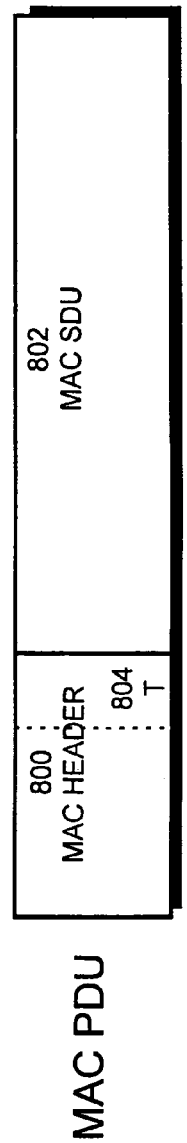
FIG. 8 illustrates the structure of a Medium Access Control Layer Protocol Data Unit.

In the receiver end, the logical channel specific parameter needed for deciphering can be read from an unciphered MAC header, for example from the C/T-field of the MAC header. The structure of the MAC PDU is illustrated in FIG. 8. The MAC PDU consists of an optional MAC header 800 and a MAC Service Data Unit (MAC SDU) 802. Both the MAC header and the MAC SDU are of variable size. The content and the size of the MAC header 800 depend on the type of the logical channel, and in some cases none of the parameters in the MAC header 800 are needed. The size of the MAC-SDU 802 depends on the size of the RLC PDU, which is defined during the set-up procedure. The MAC header 800 comprises a C/T-field 804. This option allows efficient MAC multiplexing of different logical channels (or different instances of the same logical channel type) into one transport channel, both into dedicated transport channels and common transport channels. When this method is used, the MAC header is not ciphered, which allows separating the different MAC PDUs in the receiver end and which in the common channel mode allows reading the RNTI (Radio Network Temporary Identity) field that is needed for routing messages to the correct entity in the UTRAN.

Connected with the ciphering algorithm 400 there are ciphering means 416A, 416B, 416C for producing ciphered data 418A, 418B, 418C by applying the ciphering mask 412A, 412B, 412C to the plain data 414A, 414B, 414C. As can be seen from FIG. 4A, the plain data includes Radio Link Control Layer Protocol Data Units from at least two parallel logical channels, and for each logical channel an individual ciphering mask is produced. So in FIG. 4A the ciphering masks 412A, 412B and 412C are all different from each other.

In block 420 the ciphered RLC-PDUs are processed through the MAC layer and mapped into one Transport Block Set, i.e. MAC PDU Set.

Another possible solution is one in which the plain data includes one Radio Link Control Layer Protocol Data Unit 414A from only one logical channel, and for said logical channel an individual ciphering mask 412A is produced. So the invention also works for the individual logical channel.

Normally a new ciphering mask is produced for each radio frame of the physical layer of the protocol stack. If interleaving is used, then a new ciphering mask can be produced for each interleaving period of the physical layer of the protocol stack. Typically one interleaving period consists of several radio frames.

The left-hand side of FIG. 4A represents the operations carried out in the transmitter. The corresponding operations will also be carried out in the receiver, as illustrated on the right-hand side of FIG. 4A. The only differences are that block 422 is used to derive RLC-PDUs out of the received Transport Block Set, and that the deciphering means 424A, 424B, 424C are used to decipher the received data.

In one embodiment of the invention, a Radio Link Control Layer Protocol Data Unit of at least one logical channel is already ciphered, and the step of producing ciphered data is not repeated for said already ciphered Radio Link Control Layer Protocol Data Unit. It is thus avoided that the data would be ciphered twice. Of course, if for example such end-to-end ciphering is used, the data can be ciphered twice: first by the application using the service, and then by the MAC layer according to the invention. This will cause no loss of transmission capacity, as the XOR operation does not add any extra bits, even if it is performed twice.

Figure 4B:
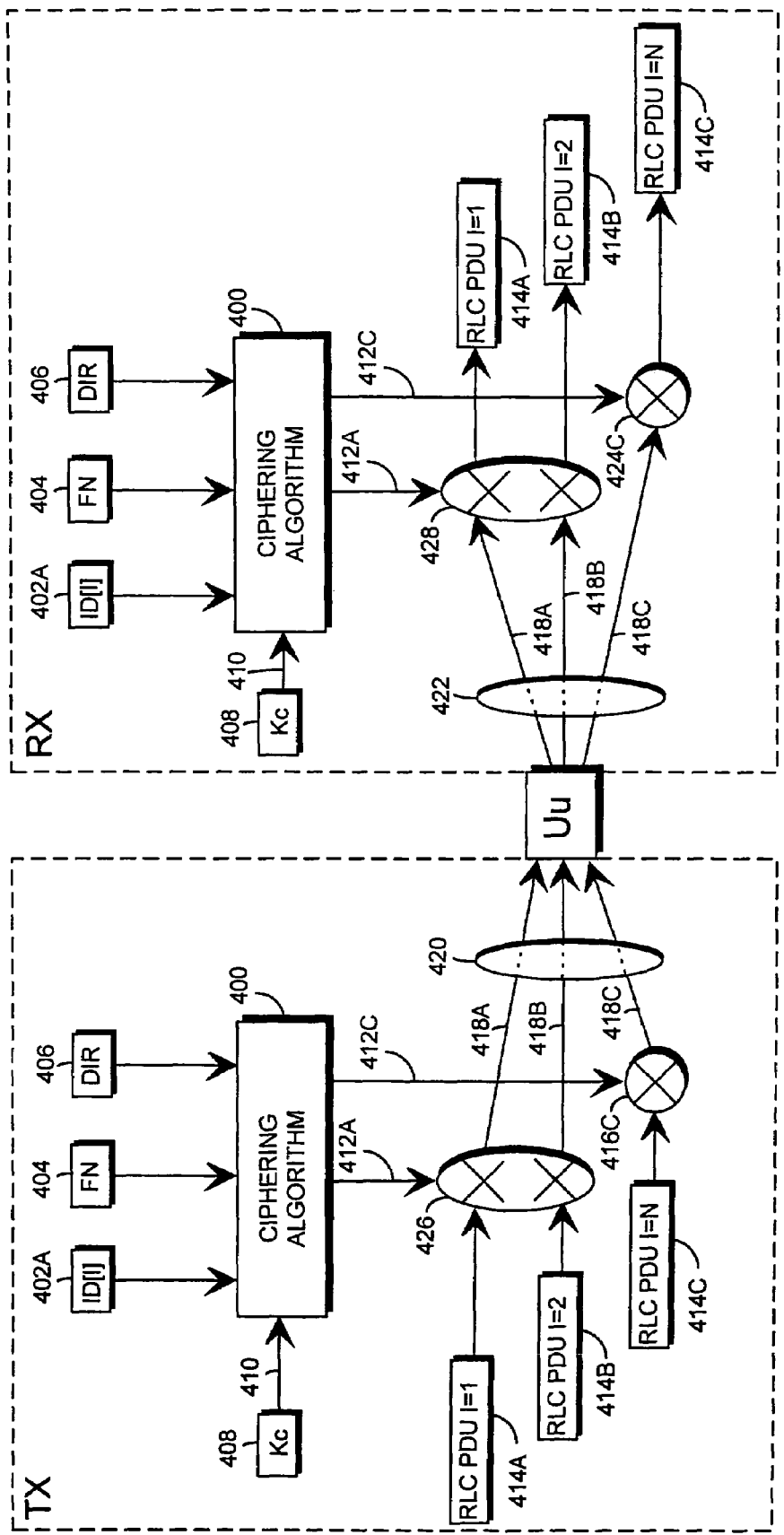

FIG. 4B illustrates a solution to a situation where the plain data includes at least two successive Radio Link Control Layer Protocol Data Units of one logical channel. If we assume, for example, that the first RLC PDU 414A and the second RLC PDU 414B are from one logical channel, then the problem can be solved in such a way that only one ciphering mask 412A is produced for these PDUs 414A, 414B. Different parts of this ciphering mask 412A are then used for ciphering the first PDU 414A and the second PDU 414B. The length of the required ciphering mask 412A in this case is naturally the sum of the lengths of the first and the second PDU 414A, 414B. Because the PDUs 414A, 414B are from the same logical channel (same Radio Access Bearer), the maximum length required can be calculated as being two times the maximum RLC PDU size of that bearer.

Figure 4C:
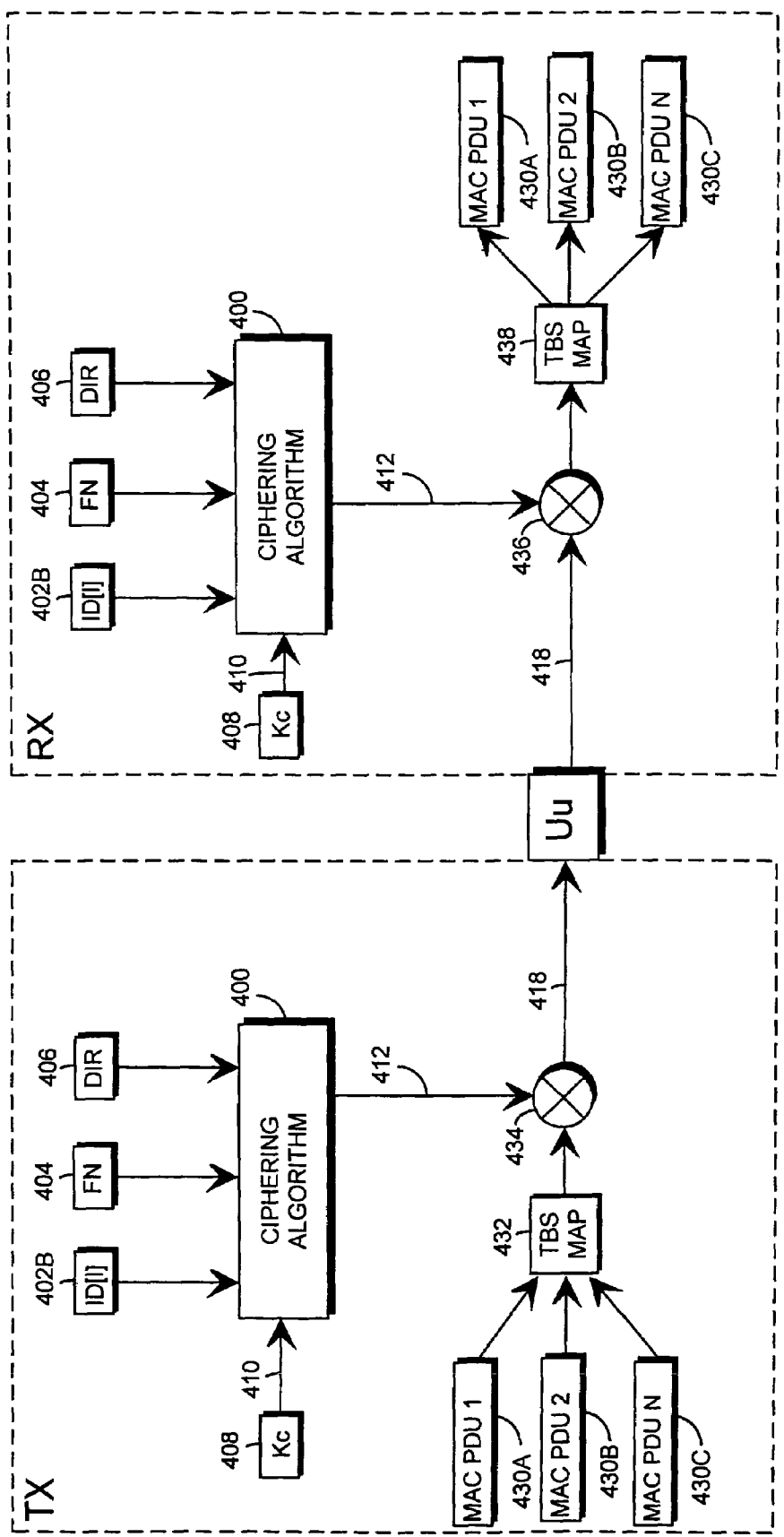

FIG. 4C illustrates a situation where the plain data includes one Transport Block Set (TBS) including Medium Access Control Layer Protocol Data Units of at least two different logical channels, and for each Transport Block Set one ciphering mask 412 is used in producing the ciphered data. In this option, the basic unit to be ciphered is a Transport Block Set. This defines the required length of the ciphering mask 412 produced by the algorithm 400. Layer 1 still adds Transport Block specific CRCs (Cyclic Redundancy Check), but because the XOR operation does not change the length of data, it should be possible to cipher the whole TBS as one unit. The length of each transport block in the TBS has to be told to L1 anyway. This option has the disadvantage that the MAC header is also ciphered, and so the MAC PDUs cannot be routed anywhere on the network side before the TBS is deciphered. This is a problem if common channels over Iur are possible. The length of the required ciphering mask 412 is equal to the maximum Transport Block Set size for the transport channel in question.

Another possible solution is one in which the plain data includes one Transport Block Set including a Medium Access Control Layer Protocol Data Unit of one logical channel, and for each Transport Block Set one ciphering mask is used in producing the ciphered data.

The solution of the invention is implemented in the radio system preferably by software, whereby the invention requires certain functions in the protocol processing software located in the transmitter and in the receiver, especially in blocks 204A, 204B and 226A, 226B of FIG. 2A. Thus the generating means 408, the ciphering algorithm 400, and the ciphering means 416A, 416B, 416C can be software modules of the protocol stack residing in the user equipment UE and in the radio network subsystem RNS. The solution can also be implemented with hardware, for example using ASIC (Application Specific Integrated Circuit) or discrete components.

The method of the invention can be implemented, for example, in the Medium Access Control Layer of the protocol stack. This is illustrated in FIG. 7B, which shows a high-level overview of the MAC layer depicted in FIG. 7A with ciphering functions included. C1( ) and C2( ) are two alternatives for the location of ciphering. C1(0), C1(1), C1(2) and C1(3) refer to the use of logical channel specific ciphering parameters as explained above with reference to FIGS. 4A and 4B, whereas C2(00), C2(01) and C2(02) refer to the use of transport channel specific ciphering parameters. Some MAC functions may be needed below C2(00), C2(01) and C2(02) blocks, but for the sake of clarity they are not illustrated here. Basically the RLC PDUs come to the MAC layer from each logical channel. In the MAC layer the RLC-PDUs are then mapped to the MAC PDUs in the functional blocks 700, 702, 704, which include the operations for the PCH, BCH, SCH, Dedicated Channel and Common Channel operations. Normally one RLC PDU is mapped to one MAC PDU (=Transport Block). This mapping realizes the mapping from a logical channel to a transport channel. The mapping rules have been explained above in connection with FIG. 7C. If ciphering is used for the CCCH then a ciphering block, for example C1(4), should be in FIG. 7B in the line between the 'CCCH' and the functional block 704.

Even though the invention is described above with reference to an example shown in the attached drawings, it is apparent that the invention is not restricted to it, but can vary in many ways within the inventive idea disclosed in the attached claims.

The invention claimed is:

1. A method comprising:
   generating a ciphering key;
   producing a ciphering mask in a ciphering algorithm using the ciphering key as an input parameter,
   producing ciphered data by applying the ciphering mask to plain data; and
   using a logical channel identifying parameter or a transport channel identifying parameter as an additional input parameter to the ciphering algorithm;
   wherein the plain data includes Radio Link Control Layer Protocol Data Units from at least two parallel logical channels for communication with one user equipment, and for each logical channel an individual ciphering mask is produced.

2. The method as claimed in claim 1, further comprising using the direction of transmission as an additional input parameter to the ciphering algorithm.

3. The method as claimed in claim 1, wherein the logical channel identifying parameter is one of the following: a Radio Access Bearer Identifier, a Logical Channel Identifier, or a Signaling Link Identifier.

4. The method as claimed in claim 1, wherein the transport channel identifying parameter is a Dedicated Channel Identifier.

5. The method as claimed in claim 1, further comprising using a radio frame identifying parameter as an additional input parameter to the ciphering algorithm.

6. The method as claimed in claim 5, wherein the radio frame identifying parameter is a User Equipment Frame Number.

7. The method as claimed in claim 1, wherein a Radio Link Control Layer Protocol Data Unit of at least one logical channel is already ciphered, and wherein producing ciphered data is not repeated for said already ciphered Radio Link Control Layer Protocol Data Unit.

8. The method as claimed in claim 1, wherein the plain data further includes at least two successive Radio Link Control Layer Protocol Data Units of one logical channel, and further comprising using for each Radio Link Control Layer Protocol Data Unit of one logical channel a different part of the ciphering mask in producing the ciphered data.

9. The method as claimed in claim 1, further comprising performing the ciphering in the Medium Access Control Layer of a protocol stack.

10. The method as claimed in claim 1, further comprising producing a new ciphering mask for each radio frame of the physical layer of the protocol stack.

11. The method as claimed in claim 1, further comprising producing a new ciphering mask for each interleaving period of the physical layer of the protocol stack.

12. An apparatus comprising:
   a generator configured to generate a ciphering key;
   a ciphering algorithm device connected with the generator, said device configured to produce a ciphering mask using the ciphering key as an input parameter,
   a ciphering circuit connected with the ciphering algorithm device, said circuit configured to produce ciphered data by applying the ciphering mask to plain data; and the ciphering algorithm device being configured to use a logical channel identifying parameter or a transport channel identifying parameter as an additional input parameter, wherein the ciphering circuit is configured to accept plain data including Radio Link Control Layer Protocol Data Units from at least two parallel logical channels, and the ciphering algorithm device is configured to produce for each logical channel an individual ciphering mask and the ciphering circuit is configured to use for each logical channel the ciphering mask of said channel.

13. The apparatus as claimed in claim 12, wherein the ciphering algorithm device is configured to use the direction of transmission as an additional input parameter.

14. The apparatus as claimed in claim 12, wherein the logical channel specific parameter is one of the following: a Radio Access Bearer Identifier, a Logical Channel Identifier, or a Signaling Link Identifier.

15. The apparatus as claimed in claim 12, wherein the transport channel specific parameter is a Dedicated Channel Identifier.

16. The apparatus as claimed in claim 12, wherein the ciphering algorithm device is configured to use a radio frame specific parameter as an additional input parameter.

17. The apparatus as claimed in claim 16, wherein the radio frame specific parameter is a User Equipment Frame Number.

18. The apparatus as claimed in claimed in claim 12, wherein a Radio Link Control Layer Protocol Data Unit of at least one channel is already ciphered, and the ciphering circuit is configured not to cipher said already ciphered Radio Link Control Layer Protocol Data Unit.

19. The apparatus as claimed in claim 12, wherein the ciphering circuit is configured to accept plain data including at least two successive Radio Link Control Layer Protocol Data Units of one logical channel, and the ciphering algorithm device is configured to produce for said logical channel an individual ciphering mask and the ciphering circuit is configured to use for each Radio Link Control Layer Protocol Data Unit a different part of the ciphering mask.

20. The apparatus as claimed in claim 12, wherein the generator, the ciphering algorithm device, and the ciphering circuit reside in the Medium Access Control Layer of a protocol stack.

21. The apparatus, as claimed in claim 12, wherein the ciphering algorithm device is configured to produce a new ciphering mask for each radio frame of the physical layer of the protocol stack.

22. The apparatus, as claimed in claim 12, wherein the ciphering algorithm device is configured to produce a new ciphering mask for each interleaving period of the physical layer of the protocol stack.

23. A system comprising;
a generator configured to generate a ciphering key;
a ciphering algorithm device connected with the generator, said device configured to produce a ciphering mask using the ciphering key as an input parameter;
a ciphering circuit connected with the ciphering algorithm device, said circuit configured to produce ciphered data by applying the ciphering mask to plain data;
and the ciphering algorithm device being configured to use a logical channel identifying parameter or a transport channel identifying parameter as an additional input parameter, wherein the ciphering circuit is configured to accept plain data including Radio Link Control Layer Protocol Data Units from at least two parallel logical channels for communication with one user equipment, and the ciphering algorithm device is configured to produce for each logical channel an individual ciphering mask and the ciphering circuit is configured to use for each logical channel the ciphering mask of said channel.

24. The system as claimed in claim 23, wherein the ciphering algorithm device is configured to use the direction of the transmission as an additional input parameter.

25. The system as claimed in claim 23, wherein the logical channel identifying parameter is one of the following; a Radio Access Bearer Identifier, a Logical Channel Identifier, a Signaling Link Identifier.

26. The system as claimed in claim 23, wherein the transport channel identifying parameter is a Dedicated Channel Identifier.

27. The system as claimed in claim 23, wherein the ciphering algorithm device is configured to use a radio frame specific parameter as an additional input parameter.

28. The system as claimed in claim 27, wherein the radio frame specific parameter is a User Equipment Frame Number.

29. The system as claimed in claim 23, wherein a Radio Link Control Layer Protocol Data Unit of at least one logical channel is already ciphered, and the ciphering circuit is configured not to cipher said already ciphered Radio Link Control Layer Protocol Data Unit.

30. The system as claimed in claim 23, wherein the ciphering circuit is configured to accept plain data including a Radio Link Control Layer Protocol Data Unit from one logical channel, the ciphering algorithm device is configured to produce for said logical channel an individual ciphering mask, and the ciphering circuit is configured to use for said logical channel the ciphering mask of said channel.

31. The system as claimed in claim 23, wherein the ciphering circuit is configured to accept plain data including at least two successive Radio Link Control Layer Protocol Data Units of one logical channel, the ciphering algorithm device is configured to produce for said logical channel an individual ciphering mask, and the ciphering circuit is configured to use for each Radio Link Control Layer Protocol Data Unit a different part of the ciphering mask.

32. The system as claimed in claim 23, wherein the generator, the ciphering algorithm device, and the ciphering circuit reside in the Medium Access Control Layer of a protocol stack.

33. The system as claimed in claim 23, wherein the ciphering algorithm device is configured to produce a new ciphering mask for each radio frame of the physical layer of the protocol stack.

34. The system as claimed in claim 23, wherein the ciphering algorithm device is configured to produce a new ciphering mask for each interleaving period of the physical layer of the protocol stack.

* * * * *

UNITED STATES PATENT AND TRADEMARK OFFICE
CERTIFICATE OF CORRECTION

PATENT NO. : 7,602,917 B2
APPLICATION NO. : 11/013184
DATED : October 13, 2009
INVENTOR(S) : Vialen et al.

It is certified that error appears in the above-identified patent and that said Letters Patent is hereby corrected as shown below:

Column 13, line 27, in Claim 18, delete "claimed in claimed in" and insert --claimed in--, therefor.

Signed and Sealed this

Twenty-fourth Day of August, 2010

David J. Kappos
*Director of the United States Patent and Trademark Office*